US008805117B2

(12) United States Patent
Liu et al.

(10) Patent No.: US 8,805,117 B2
(45) Date of Patent: Aug. 12, 2014

(54) METHODS FOR IMPROVING IMAGE SEARCH IN LARGE-SCALE DATABASES

(75) Inventors: Qiong Liu, Milpitas, CA (US);
Chunyuan Liao, San Jose, CA (US);
Xin Yang, Santa Barbara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 57 days.

(21) Appl. No.: 13/186,432

(22) Filed: Jul. 19, 2011

(65) Prior Publication Data
US 2013/0022280 A1    Jan. 24, 2013

(51) Int. Cl.
*G06K 9/66*    (2006.01)
*G06K 9/46*    (2006.01)
*G06K 9/32*    (2006.01)

(52) U.S. Cl.
USPC .......................... 382/294; 382/190; 382/201

(58) Field of Classification Search
CPC ... G06T 7/0034; G06K 9/6218; G06K 9/6202
USPC .......... 382/103, 190, 199, 201, 286, 294, 298
See application file for complete search history.

(56) References Cited

U.S. PATENT DOCUMENTS

| 7,639,839 B2* | 12/2009 | Chiu et al. ..................... 382/103 |
| 7,724,959 B2* | 5/2010 | Chiu et al. ..................... 382/190 |
| 2005/0213818 A1* | 9/2005 | Suzuki et al. ................. 382/190 |
| 2008/0013836 A1* | 1/2008 | Nakamura et al. ............ 382/209 |
| 2010/0021065 A1* | 1/2010 | Sibiryakov .................... 382/190 |
| 2010/0080469 A1* | 4/2010 | Liu et al. ....................... 382/201 |

OTHER PUBLICATIONS

"Photo-collection representation based on viewpoint clustering", in Electronic Imaging and Multimedia Technology V, Liwei Zhou; Chung-Sheng Li; Minerva M. Yeung, Editors, Proceedings of SPIE vol. 6833 (SPIE, Bellingham, WA 2007).*
A.Sibiryakov, M.Bober, "Image registration using RST-clustering and its application in remote sensing", Proc. of SPIE, vol. 6365, Image and Signal Processing for Remote Sensing XII, 2006.*
Startchik et al, Planar shape databases with affine invariant search, First International Workshop on Image Databases and Multi Media Search, IAPR—Multi Media and Image Communications Aug. 22-23, 1996, Amsterdam, The Netherlands.*
Aidong Zhang, Biao Cheng, Raj Acharya, A Fractal-Based Clustering Approach in Large Visual Database Systems, Representation and Retrieval of Visual Media in Multimedia Systems, 996, pp. 49-68.*
Lowe, D. G., Distinctive Image Features from Scale-Invariant Keypoints, International Journal of Computer Vision, 60, 2, pp. 1-28, 2004.
Wu, Z., et al., Bundling Features for Large Scale Partial-Duplicate Web Image Search, Proceedings of CVPR'09, Jun. 2009.

(Continued)

*Primary Examiner* — Andrae S Allison
(74) *Attorney, Agent, or Firm* — Sughrue Mion, PLLC (57) ABSTRACT

Systems and methods for addressing the problem of specific planar object search from a large-scale image database. Given a query image with a particular object and a planar surface, the systems and methods attempt to find, from a large image corpus, a set of representative images in which that object appears. According to the complexity of geometric transformations between a query image and its target images, the whole problem can be categorized into two classes: Rotation-Scale-Translation (RST)-transformed image search, and affine/homography-transformed image search.

19 Claims, 9 Drawing Sheets

(56) References Cited

OTHER PUBLICATIONS

Zhou, W., et al., Spatial Coding for Large Scale Partial-Duplicate Web Image Search. page 511-520 Proceedings of ACM Multimedia'10, Oct. 2010.

Jegou, H., et al., Hamming Embedding and Weak Geometric Consistency for Large Scale Image Search, pp. 1-15, Proceedings of ECCV'08, Oct. 2008.

Lazebnik, S., et al., Beyond Bags of Features: Spatial Pyramid Matching for Recognizing Natural Scene Categories, Proceedings of CVPR'06, Jun. 2006.

Chum, O., et al., Geometric min-Hashing: Finding a (Thick) Needle in a Haystack, pp. 1-8, Proceedings of CVPR'09. Jun. 2009.

Philbin, J., et al., Object Retrieval with Large Vocabularies and Fast Spatial Matching. Proceedings of CVPR'07. Jun. 2007.

Sivic, J. and Zisserman, A. Video Google: A Text Retrieval Approach to Object Matching in Videos. pp. 1-8, Proceedings of the International Conference on Computer Vision (2003).

Nistér D., Stewenius H., Scalable Recognition with Vocabulary Tree. Proceeding of the CVPR06. Jun. 2006.

Liu, Q., et al., Embedded Media Marker: Linking Multimedia to Paper. Proceedings of ACM Multimedia'10. Oct. 2010.

Liu, Q., et al., Embedded Media Markers: Marks on Paper that Signify Associated Media, p. 1-10, Proceedings of IUI'10. Feb. 2010.

Liu, Q., et al., Embedded Media Barcode Links: Optimally Blended Barcode Overlay on Paper for Linking to Associate Media, Proceedings of ACM International Conference on Multimodal Interfaces, Nov. 2010.

Wikipedia, Barcode. http://en. Wikipedia.org/wiki/Barcode, pp. 1-19, retrieved Jun. 22, 2011.

Erol, B., et al., HOTPAPER: Multimedia Interaction with Paper using Mobile Phones. Proceedings of Multimedia'08. Oct. 2008.

Liu, X., and Doermann, D. Mobile Retriever: Access to Digital Documents from Their Physical Source. International Journal on Document Analysis and Recognition., 2008. 11(1): p. 19-27.

Donoser, M. and Bischof, H. Efficient Maximally Stable Extremal Region (MSER) Tracking. Proceeding of CVPR06. Jun. 2006.

Philbin, J., et al., Lost in Quantization: Improving Particular Object Retrieval in Large Scale Image Databases, Proceedings of CVPR'08. Jun. 2008.

\* cited by examiner

METHODS FOR IMPROVING IMAGE SEARCH IN LARGE-SCALE DATABASES

BACKGROUND

1. Field of the Invention

The present application is generally directed to image search and more specifically, to improving image search in large-scale databases.

2. Description of the Related Art

There have been several attempts to address the problem of searching for a specific planar object within a large-scale image database. Given a query image which contains a particular object with a planar surface, the objective is to find, from a large image corpus, a set of representative images in which that object appears. According to the complexity of geometric transformations between a query image and its target images, the problem can be categorized into two classes: Rotation-Scale-Translation (RST)-transformed image search, and affine/homography-transformed image search. Two concrete applications based on the former technique are EMM identification and partial-duplicate image detection. In EMM identification, query images are phone-captured copies of a source image with slightly 3D view-point changes; therefore the major geometric changes between two matched images can be implied by RST transformations. Similarly, in partial-duplicate image detection, image variations are mainly due to 2D digital-editing techniques applied on a source image; hence a RST transformation can well account for the geometric changes between matched images in this case.

However, in many cases, there may be images with more general and complex transformations other than RST, such as affine transformation or even homography transformations. For example, a user may capture a picture of a movie poster on the street from a certain aspect. Based on this captured query image, the user may want to search its high-quality images or related online film review. Applications in this scenario have utilized on the latter technique "affine/homography-transformed image search" for a better search precision.

Bag-Of-Words Representation

Bag-of-words representations, together with the inverted file indexing technique, have demonstrated impressive performance in terms of scalability and accuracy. However, bag-of-words representations discard all the spatial information of visual words which greatly limit the descriptive ability and thus the search precision is usually very low. Many approaches were proposed with the aim of compensating the loss of spatial information for improving the search accuracy. Other approaches utilize full geometric verification methods, which achieve robustness and high search precision at significantly computational expense. A more efficient approach is to augment a basic visual-word representation with spatial relationships between its neighboring features, but existing approaches based on this idea have incurred high memory cost.

The state-of-the-art methods for image search tend to rely on bag-of-words representations and scalable textual indexing schemes. However, bag-of-words representation disregards all the spatial layout information of visual words; hence greatly limits the descriptive ability and leads to a low search precision. To compensate the loss of spatial information, some methods utilize a spatial pyramid matching scheme which partitions an image into increasingly fine sub-regions and only matches visual words inside the corresponding sub-region. Even though such scheme is fast and simple to implement, hard gridding scheme is sensitive to misalignment of sub-regions caused by large geometric transformations.

Full Geometric Verification

Full geometric verification methods, which utilize robust fitting methods, such as RANSAC or Least Median of Squares (LMEDS), can cope with general transformations and hence they are usually employed to remove false matches. Typically, a hypothesized transformation model between two images is estimated based on features. All of the features are then verified by the estimated model and those that are inconsistent with the model are removed as outliers. But a full model fitting procedure is too computationally expensive. In addition, due to the large percentage of outliers arising from quantization errors and background clutter, full fitting methods, such as RANSAC or LMEDS usually perform poorly.

To address the problems of full geometric verification, some methods employ an outlier-filtering strategy based on an efficient but weaker geometric verification before applying a full model fitting procedure. Other methods try to augment bag-of-words representation with spatial relationships between its neighboring visual words. For example, one conventional method bundles visual words into groups by detected maximally stable extremal regions (MSER), and enforce a set of geometric constraints within each group. However, the performance of such a method largely depends on the robustness of bundling scheme, i.e. the repeatability of the MSER detector, which may easily fail on textual document images where few uniform regions can be detected. Other methods utilize a spatial coding scheme, which takes each feature point as a center and encodes the relative positions between this feature and its neighboring features. Unfortunately, such methods cost too much memory space for storing the spatial maps for all features, and therefore tends to be rather impractical.

The Hough Transform

One other strategy is to use the Hough transform to deal with outliers, i.e. false matches. The Hough transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

The classical Hough transform was concerned with the identification of lines in the image, but later the Hough transform has been extended to identifying positions of arbitrary shapes, most commonly circles or ellipses.

The Generalized Hough Transform or GHT, is the modification of the Hough Transform using the principle of template matching. This modification enables the Hough Transform to be used for not only the detection of an object described with an analytic equation (e.g. line, circle, etc.), but also for the detection of an arbitrary object described with its model.

The problem of finding the object (described with a model) in an image can be solved by finding the model's position in the image. With the Generalized Hough Transform, the problem of finding the model's position is transformed to a problem of finding the transformation's parameter that maps the model into the image. As long as the value of the transformation's parameter is known, the position of the model in the image can be determined.

The original implementation of the GHT uses edge information to define a mapping from orientation of an edge point to a reference point of the shape. In the case of a binary image where pixels can be either black or white, every black pixel of the image can be a black pixel of the desired pattern thus creating a locus of reference points in the Hough Space. Every pixel of the image votes for its corresponding reference points. The location of the cell with maximum votes in the Hough Space indicates the pattern parameters of the image.

The main drawbacks of the GHT are its substantial computational and storage requirements that become acute when object orientation and scale have to be considered. Orientation information of the edge has been utilized for decreasing the cost of the computation. Other GHT techniques have been suggested such as the SC-GHT (Using slope and curvature as local properties).

Hough transforms have been used to remove obvious outliers (false matches of features) and identify clusters of inliers (true matches of features) which imply consistent transformation interpretation. Some methods utilize four parameters: the location on a two dimensional plane, scale and orientation of a query feature relative to its matched indexed features, to vote for one of the coarsely quantized bins in Hough space. Clusters of features which cast into bins with more than three votes will be used for estimating affine projection parameters based on a least-squares solution. Other methods simply utilize the differences of scale and orientation between two matched visual words and filters out matches which do not vote for the main bins.

However, present Hough transform methods are carried out based on an individual corresponding feature pair without considering any constraints from surrounding features, which is an important clue for outlier filtering. Moreover, due to the rough parameter estimations in these methods, large quantization bin size is pre-determined and used for Hough space voting, which yields a limited inlier-outlier-separation and place more computation burdens on the following full geometric verification. Even though such Hough transform methods may be fast, all of these methods utilize very roughly estimated parameters, coarse and pre-determined Hough spaces and a simple voting strategy. Therefore, they tend not to perform as well as RANSAC in segmenting outliers from inliers, especially for complex transformations, e.g. affine or homography transformation.

SUMMARY

The inventive methodology is directed to methods and systems that substantially obviate one or more of the above and other problems associated with conventional techniques for image search.

Aspects of the present invention include a method of comparing a query image to a stored image, which may involve grouping features from the query image as a segment or a polygon; using feature group transformation voting to determine inlier features for the query image; and using votes of the inlier features of the query image to decide the best matched image.

Aspects of the present invention further include a system, which may involve an apparatus for receiving a query image; an inlier determination unit grouping features from the query image as a segment or a polygon and performing a transformation check in Hough Space on the segment or polygon to determine inlier features for the query image; and a geometric verification unit for computing the feature transformations between the query image and stored images. The apparatus may involve a camera.

Aspects of the present invention further include a non-transitory computer readable medium executing a process for comparing a query image to at least one stored image. The process may involve grouping features from the query image as a segment or a polygon; performing a transformation verification in Hough Space on the segment or polygon to determine inlier features for the query image; and using votes of these inlier features to select the best matched stored image of the at least one stored image.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE EMBODIMENTS

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Various embodiments of the invention employ Hough transforms for improving search accuracy and speeding up the verification process for specific planar object search in large-scale databases. To address the limitations in existing Hough-based methods, a more accurate parameter estimation based on matching point relations in the whole image is performed. Compared with conventional techniques, more accurate parameter estimation may provide better inlier-outlier separation, which may consequently reduce the burden of full geometric verification while improve search precision. In addition, to cope with the boundary effects caused by pre-defined quantized bin, a more robust procedure, called 2D dense region detection, is utilized, which can identify cluster of consistent features distribute in any density and does not rely too much on the quantization size. For RST image search, the detected dense region can be directly used for computing the accurate RST parameter values, either by averaging the weighted quantized values (memory cheap) within the region or by averaging the real values estimated based on MSSs (more precise but cost more memory) within the region. Experiments in a large-scale database with more than 200 k images, shows that various embodiments of the invention tend to achieve consistently high accuracy, i.e. more than 99% top3 accuracy in EMM identification and more than 8.5 top10 precision in partial-duplicate image detection. Furthermore, low memory and time cost tend to be achieved as well, i.e. less than 560 ms and 1.2 GB memory space for EMM identification and less than 1.2 s and 880 GB memory space for partial-duplicate image detection.

To further reduce the computational complexity, especially for images with complex transformations, a coarse-level Hough transform is utilized, which can filter obvious outliers and group inliers into clusters at an early stage, thus yielding a two-level Hough transform for geometric verification.

For affine/homography transformed image search, a major challenge for Hough-based verification using MSSs-estimated parameters is the large percentage of outliers in high-dimensional parameter spaces. When breaking a full parameter space into several 2D Hough space, each 2D Hough transform is more likely to fit models from outliers rather than inliers. To address this problem, a set of 2D Hough transforms are bundled together for segmenting inliers and outliers. Each 2D Hough space is used as a "weak classifier" to classify a sample; and a voting strategy is then utilized to make the final decision.

Outliers Filtering Based on Hough Transform For RST Transformed Images Search

For Rotation-Scale-Translation (RST)-transformed image queries, embodiments of the invention utilize Hough Space filtering. For each pair of matching points between images, embodiments of the invention obtain a set of parameters and accumulate them in Hough Space for parameter estimation.

To overcome RANSAC and LMEDS problems, embodiments of the invention utilize Hough Transform approach to filter out outliers and speed up the verification process, while performing more accurate parameter estimation based on matching point relations in the whole image. Compared with normal Hough Transform systems, utilizing more accurate parameter estimation provides better inlier-outlier separation. A better inlier-outlier separation can further reduce full geometric verification burden and improve the recognition result. The outlier filtering utilizes the following three concepts.

Estimation of Representative Parameters: Estimation of representative parameters are computed with minimum sample sets (MSSs). A minimum sample set contains the smallest number of samples or features for determining the model parameters.

Dense Region Detection For Hough Transform: Instead of using pre-defined quantized bin for voting and the main bin (bin contains most votes) detection, a more robust procedure, hereinafter described as 2D dense region detection, is utilized to identify clusters of consistent features distributed in any density while not overly relying on the quantization size. Such cluster of inliers detection method can be used in a sequential order to reduce the computational and space complexity.

Calculating Accurate Parameters Based on the Detected Dense Region: Based on the detected inliers, which are features within the detected dense region, the parameter values can be directly computed either by averaging the weighted quantized values within the region or by averaging the real values estimated based on MSSs within the region.

Ranking Visual Words. Visual words of a query image are ranked based on their distances to the image center in increasing order.

Representative Parameters Estimation

The RST transformation of an indexed point $[x,y]^T$ to a query point $[u,v]^T$ can be written as $$\begin{bmatrix} u \\ v \end{bmatrix} = \begin{bmatrix} s*\cos\theta & s*\sin\theta \\ -s*\sin\theta & s*\cos\theta \end{bmatrix} \begin{bmatrix} x \\ y \end{bmatrix} + \begin{bmatrix} t_x \\ t_y \end{bmatrix}$$

Where the isotropic scaling, rotation and translation are represented by s, $\theta$, $[t_x, t_y]^T$, respectively.

For simplicity of notation, let a=s*cos $\theta$, b=s*sin $\theta$, then we can rewrite the RST transformation as:

$$\begin{bmatrix} u \\ v \end{bmatrix} = \begin{bmatrix} a & b \\ -b & a \end{bmatrix} \begin{bmatrix} x \\ y \end{bmatrix} + \begin{bmatrix} t_x \\ t_y \end{bmatrix}$$

To solve the four transformation parameters (a, b, $t_x$, $t_y$), at least two features are needed. Therefore, the transform is conducted based on at least two features, so a segment or a polygon of features is used. Given a segment or a polygon made from N features, estimating parameters based on every MSS, as shown in formula (I), will provide N(N−1)/2 parameter estimations.

$$\Delta u_{ij} = u_i - u_j = a_{ij}(x_i - x_j) + b_{ij}(y_i - y_j) = a_{ij}\Delta x_{ij} + b_{ij}\Delta y_{ij} \quad (1)$$

$$\Delta v_{ij} = v_i - v_j = -b_{ij}(x_i - x_j) + a_{ij}(y_i - y_j) = -b_{ij}\Delta x_{ij} + a_{ij}\Delta y_{ij}$$

$$\Rightarrow a_{ij} = \frac{\Delta u_{ij}\Delta x_{ij} + \Delta v_{ij}\Delta y_{ij}}{\Delta x_{ij}^2 + \Delta y_{ij}^2},$$

$$b_{ij} = \frac{\Delta u_{ij}\Delta y_{ij} - \Delta v_{ij}\Delta x_{ij}}{\Delta x_{ij}^2 + \Delta y_{ij}^2}$$

$$tx_{ij} = u_i - a_{ij}x_i - b_{ij}y_i,$$

$$ty_{ij} = v_i - a_{ij}y_i + b_{ij}x_i$$

Where $[\Delta u_{ij} \, \Delta v_{ij}]^T$, $[\Delta x_{ij} \, \Delta y_{ij}]^T$ are differences between the query points $[u_i, v_i]^T$ and $[u_j, v_j]^T$ and differences between the corresponding matched indexed points $[x_i, y_i]^T$ and $[x_j, y_j]^T$, respectively. $(a_{ij}, b_{ij}, tx_{ij}, ty_{ij})$ are parameters computed based on the two features.

Dense Region Detection For Hough Transform

Given the parameters, a standard Hough transform procedure includes three steps: a) constructing an accumulator space by quantizing the full-parameter space into pre-defined bins; b) casting each parameter into a bin in accumulator space; and c) finding the main bin which contains most parameters. There are two major limitations in such procedure. First, the time and space complexity for searching the main bin in a full-parameter space is high, which is in order of $O(K_1, \ldots K_m)$, where $K_i$ ($1 \leq i \leq m$) is the range of dimension i, and m is the number of parameters. Second, due to the errors of detected feature positions, the parameters from MSSs consist of inliers may group together in certain density instead of overlapping at one point in parameter space. Therefore, a pre-defined bin size won't perform well in segmenting inliers from outliers for all cases. If the size of pre-defined bins is too small, true inliers might fall into neighboring bins, thus the visibility of the main bin is reduced. However, if the size is too broad, many outliers will fall into the right bin.

To address the high complexity issue, embodiments of the invention break down the full 4-parameter space into two 2D spaces, namely a-b-space and $t_x$-$t_y$-space, and combine them together in a sequential order. Embodiments of the present invention first conduct a Hough transform in a-b-space to identify inliers and then obtain accurate a, b values based on these inliers. After that we compute the $t_x$ and $t_y$ for each correspondence based on the accurate a and b, and conduct the Hough transform in the $t_x$-$t_y$-space again to obtain accurate $t_x$ and $t_y$ estimations.

To address the second problem, embodiments of the invention utilize a 2D dense region detection algorithm, the process of which is shown in the table below and illustrated in FIG. 1.

---

Algorithm of 2D Dense Region Detection

Quantize the 2D space into fine bins and cast all the objects into bins of the 2D space.
Initialize: dense region = { }
for {dimension 1 and 2}
 • detect the main bin contains the most objects
  $\text{bin}_{main} = \arg \max\{N(\text{bin}_i)\}$, $N(\bullet)$ : number of objects in a $\text{bin}_{bin:\, i-n}$
 • dense region boundary in this dimension = $\{\text{bin}_{main}\}$
 • repeat
  examine the nearest neighbors of the dense region boundary bins
  if: $N(\text{bin}_{nearest}) > \text{threshold}$
   insert $\text{bin}_{nearest} \rightarrow$ dense region boundary in this dimension
   go to "repeat"
  otherwise:
   break
  end
end
Obtain the detected dense region using the boundary along each dimension.

---

Figure 1:
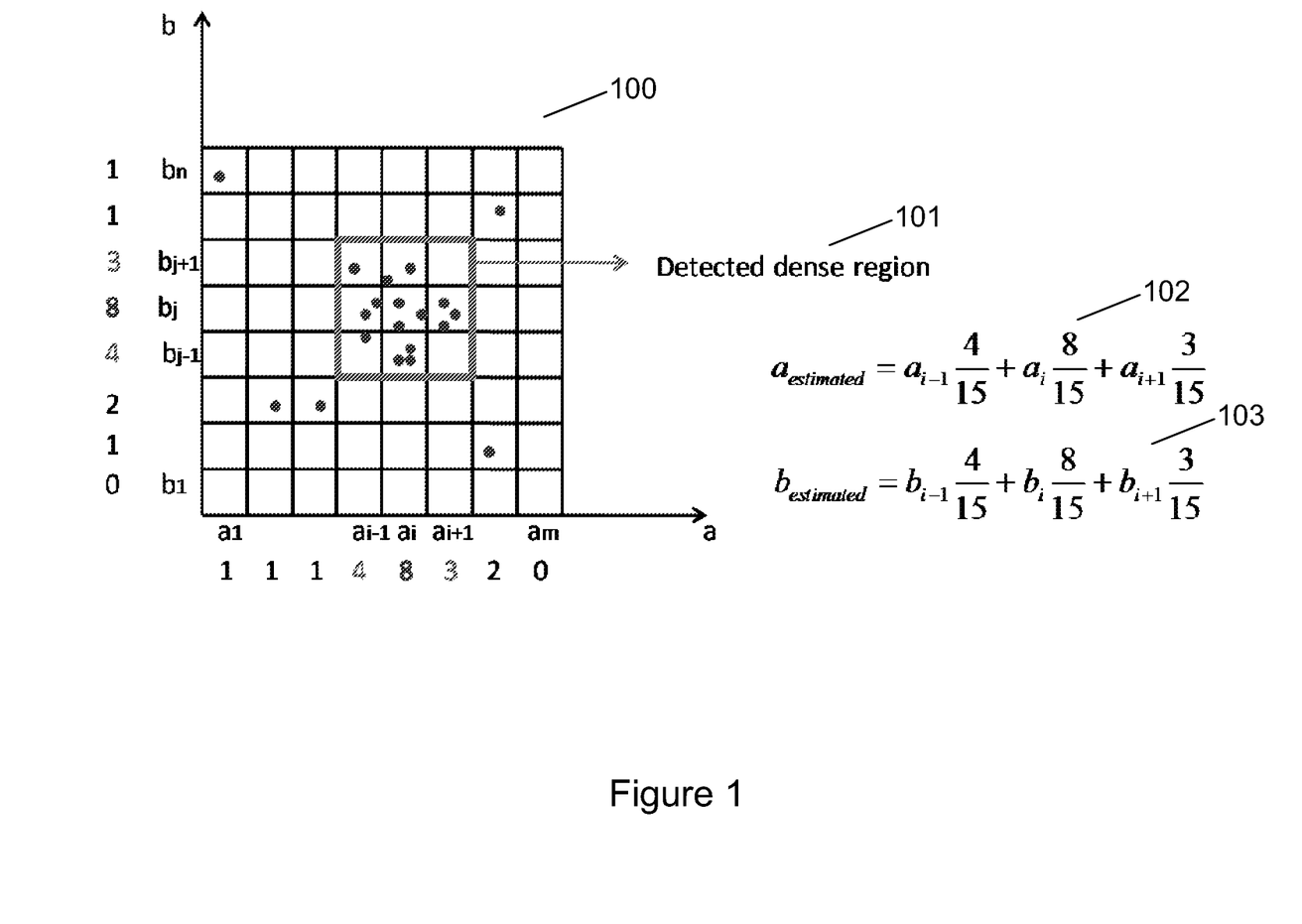
FIG. 1 illustrates an example of the 2D dense region detection algorithm according to embodiments of the invention.

FIG. 1 illustrates an example of the 2D dense region detection algorithm according to embodiments of the invention. In this example, the a-b space is quantized into 8×8 grids 100, and bins $a_i$ and $b_j$ are detected the as the main bin which contains most votes along dimensions a and b. For each detected main bin, the nearest neighboring bins are examined: if it contains enough votes (the threshold for estimating a 102 and b 103 is set to three in this example), the range of this dimension is expanded to include this bin; otherwise, stop. The region within the expanded range is determined as the detected dense region 101.

Calculating The Accurate Parameter Based On The Detected Dense Region

Based on the detected dense region, there are two ways for further computing the accurate parameters a, b, $t_x$ and $t_y$.

a) Average the weighted quantized values within the region. The weight of a quantized value can be defined as the number of objects in this bin over the total number of objects in all the bins along this dimension within the detected region. Such a scheme tends to be quick and memory efficient since we do not need to store the real parameter values obtained from each MSSs.

b) Average the real values estimated based on MSSs with in the detected region. This scheme is more accurate, but demands more memory for storing the real parameter values and more time for accessing them.

Rank Visual Words

Using and recording all the features for transformation estimation is time and memory expensive. In practice, only a subset of features are used based on the fact that the objects of interest typically utilize enough image space and are placed close to the center of query images. Thus, features located close to the query image center are more likely to appear on its target image than those reside on the margin. Based on this fact, embodiments of the invention rank the visual words of a query image according to their distances to the image center in increasing order to make it easier and faster to select such features when matching the top-ranked query features to the database.

Figure 2:
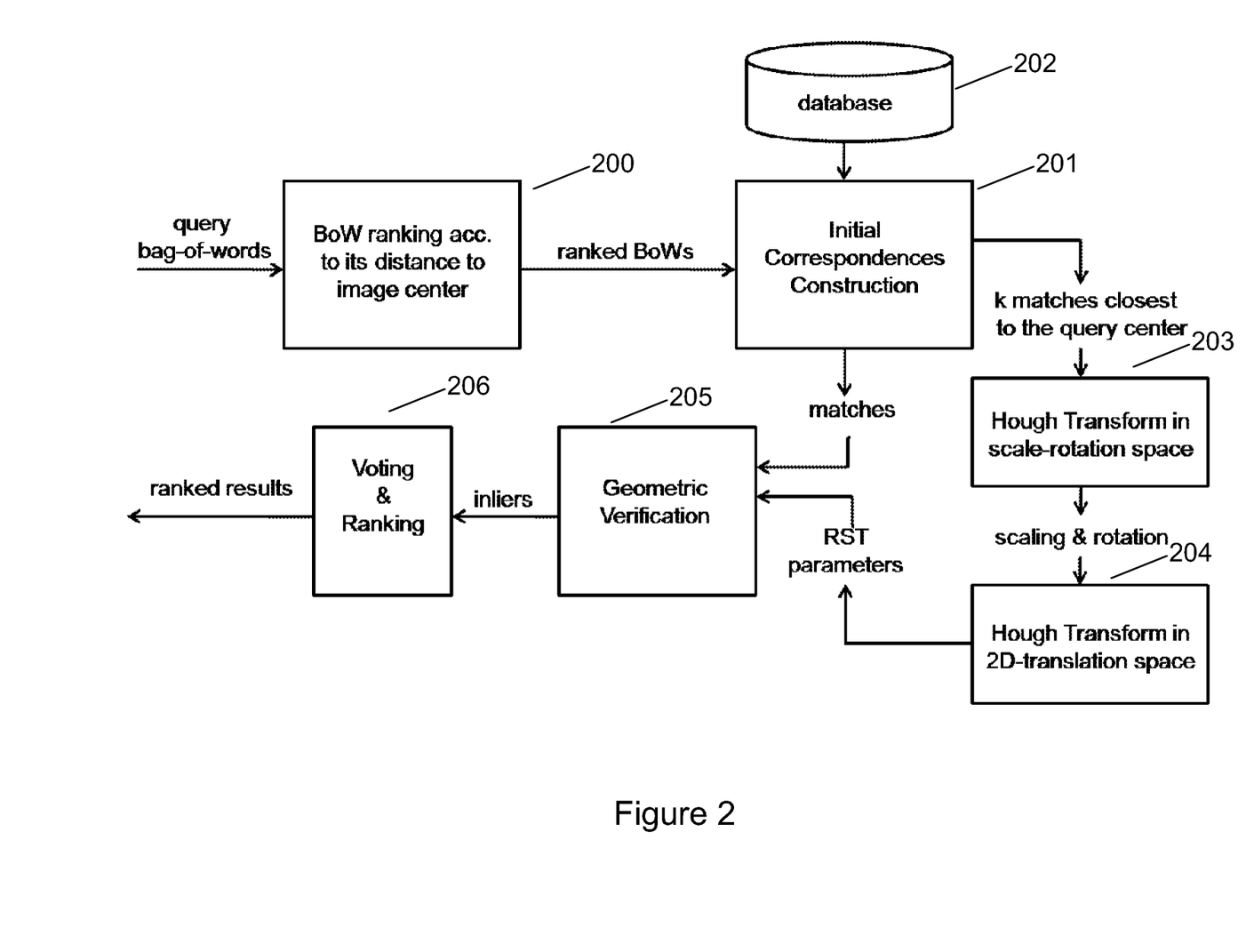
FIG. 2 illustrates an exemplary implementation for Hough transform based outlier filtering for RST transformed images.

FIG. 2 illustrates an exemplary flowchart for Hough transformed based outlier filtering for RST transformed images.

For initial filtering of features, a bag of words (BoW) query may be utilized on a query image to determine and rank features based on their distance from the image center 200. Based on the ranked BoWs, an initial correspondence construction 201 can be conducted for images in the database 202. To refine the features used in the geometric verification 205, a Hough transform is performed based on a preset number of matches closest to the query center 203, with another Hough Transform in 2D translation space 204 to handle scaling and rotation. Inliers are derived between the query image and the stored image, which are ranked 206.

Two-Level Hough Transform for Speeding-Up the Filtering Process

Estimating parameters with all the MSSs is time-consuming as the number of parameter increases. In addition, the percent of inliers in Hough Transform may also decease fast with the increase of the parameter number.

To address these problems, embodiments of the invention utilize a two-level Hough transform scheme which first carries out a coarse-level Hough transform to filter obvious outliers based on their indexed features' locations and the dense region detection algorithm, and then perform a fine-level Hough transform as described in part 1 for further refining inliers and estimating accurate parameters.

Method Description for the Two-Level Hough Transform

Figure 3:
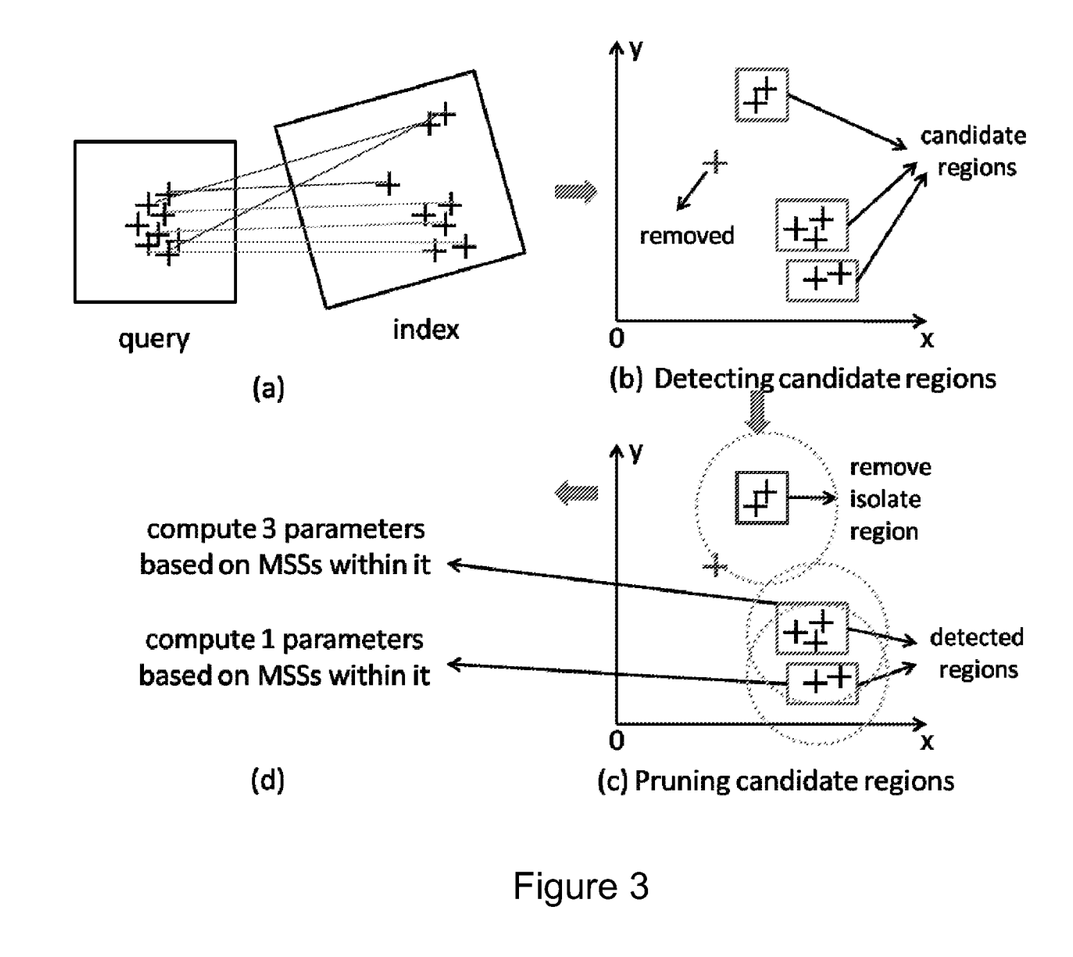
FIG. 3 illustrates an exemplary process of coarse-level Hough transform for filtering obvious outliers and clustering inliers according to embodiments of the invention.

FIG. 3 illustrates an exemplary process of coarse-level Hough transform for filtering obvious outliers and clustering inliers according to embodiments of the invention.

The parameters used for a coarse-level Hough transform may identify obvious outliers very quickly while losing only a few inliers, as illustrated in FIG. 3. Query features, which are used for estimation, are located close-by around the image centers; therefore, the corresponding indexed features, which imply a true transformation, should also group together. Accordingly, features are grouped according to the indexed features locations based on the dense region detection method as shown in FIG. 3(a). But instead of selecting only one region with most votes, embodiments of the invention first detect all candidate regions which contains more than M features, where M is the cardinality of MSSs (exemplary candidate regions are shown in FIG. 3(b)). Subsequently, the neighborhoods are checked (as indicated by the green circle in FIG. 3(c)) for each candidate region and those regions which are isolated from all the other candidate regions are pruned. Finally, embodiments of the invention obtain clusters of inliers and compute parameters based on the MSSs within each detected region as shown in FIG. 3(d).

Figure 4:
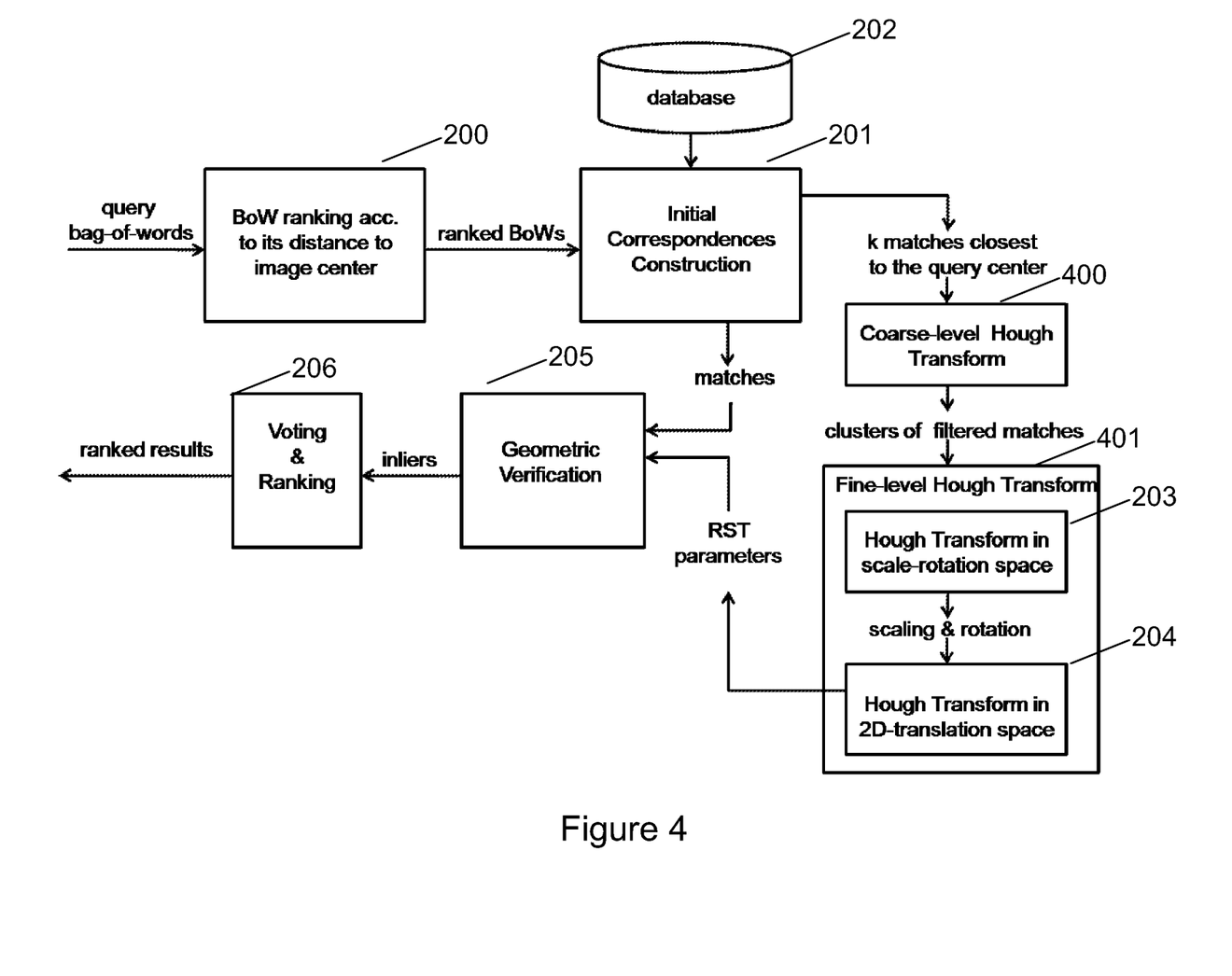
FIG. 4 illustrates an exemplary implementation of the two-level Hough transform for RST image search according to embodiments of the invention.

FIG. 4 illustrates an exemplary implementation of the two-level Hough transform for RST image search according to embodiments of the invention. In addition to the Hough transforms used in FIG. 2, an additional Coarse-level Hough Transform 400 may be used to obtain clusters of filtered matches. Conceptually, the Hough transforms of FIG. 2 can be considered as Fine-level Hough transforms 401 in comparison.

Extending Methods to Affine or Homography Transformed Images

Embodiments of the invention attempt to cope with images contain more general transformations, e.g. affine or homography transformations.

Utilizing the methods described above, embodiments of the invention achieve impressive performance for large-scale RST image search. However, directly extending such schemes for affine/homography transformed images may encounter the following two problems:

1) The computation cost for 6 or 8 parameters increases significantly, which is at the rate of $O(N^C)$, where N is the number of features used for estimation and C is the cardinality of MSSs for estimating a model.
2) As the number of parameter increases, the percentage of outliers increases significantly; therefore, if we break full parameter space into several 2D Hough space, outliers in each 2D Hough space are quite likely to form a dense region with more votes than the one formed by inliers. In other words, 2D Hough transform is more likely to fit models from outliers rather than inliers.

Method Description for Extending Methods to Affine or Homography Transformed Images To address the high computation costs, embodiments of the invention reduce the number of MSSs via two steps: a) applying a coarse-level Hough transform (described in part 2) to remove some outliers and break the whole correspondence sets into several groups; b) If the number of MSSs in each group exceeds a predefined value, further reducing the MSSs by only selecting a subset of MSSs based on each correspondence. Such strategy can significantly reduce the computational cost. For example, given 50 features for estimating 8 parameters—for a homography transformation, an exhaustive combination of all the features leads to 230301 MSSs. Assume via a coarse-level transform, features are clustered into two groups, each of which contains 25 of the total number of MSSs can be reduced to 25300. Moreover, if we only use 70% MSSs based on an individual correspondence, the number of MSSs can be further reduced to 6075.

To address the second problem, embodiments of the invention bundle a set of 2D Hough transforms for segmenting inliers and outliers. The fact is that inliers should consistently group together in most of the 2D Hough spaces; while outliers usually have much lower probability to group together densely in most of the 2D Hough spaces. Therefore, we can consider each 2D Hough space as a "weak classifier": if a sample falls into the detected dense region, it is marked as a candidate inlier; otherwise it is marked as an outlier. If there are enough number of "weak classifiers" identifies a sample as a candidate inlier, it will be kept; otherwise it will be removed. During this process, we can stop our searching in 2D Hough spaces whenever the number of inlier/outlier votes reaches a predefined threshold. A stricter but faster way for identifying outliers is to combine the "weak classifiers" in a serial way. In this scenario, if one "weak-classifier" considers a correspondence as an outlier, it will be removed.

Figure 5:
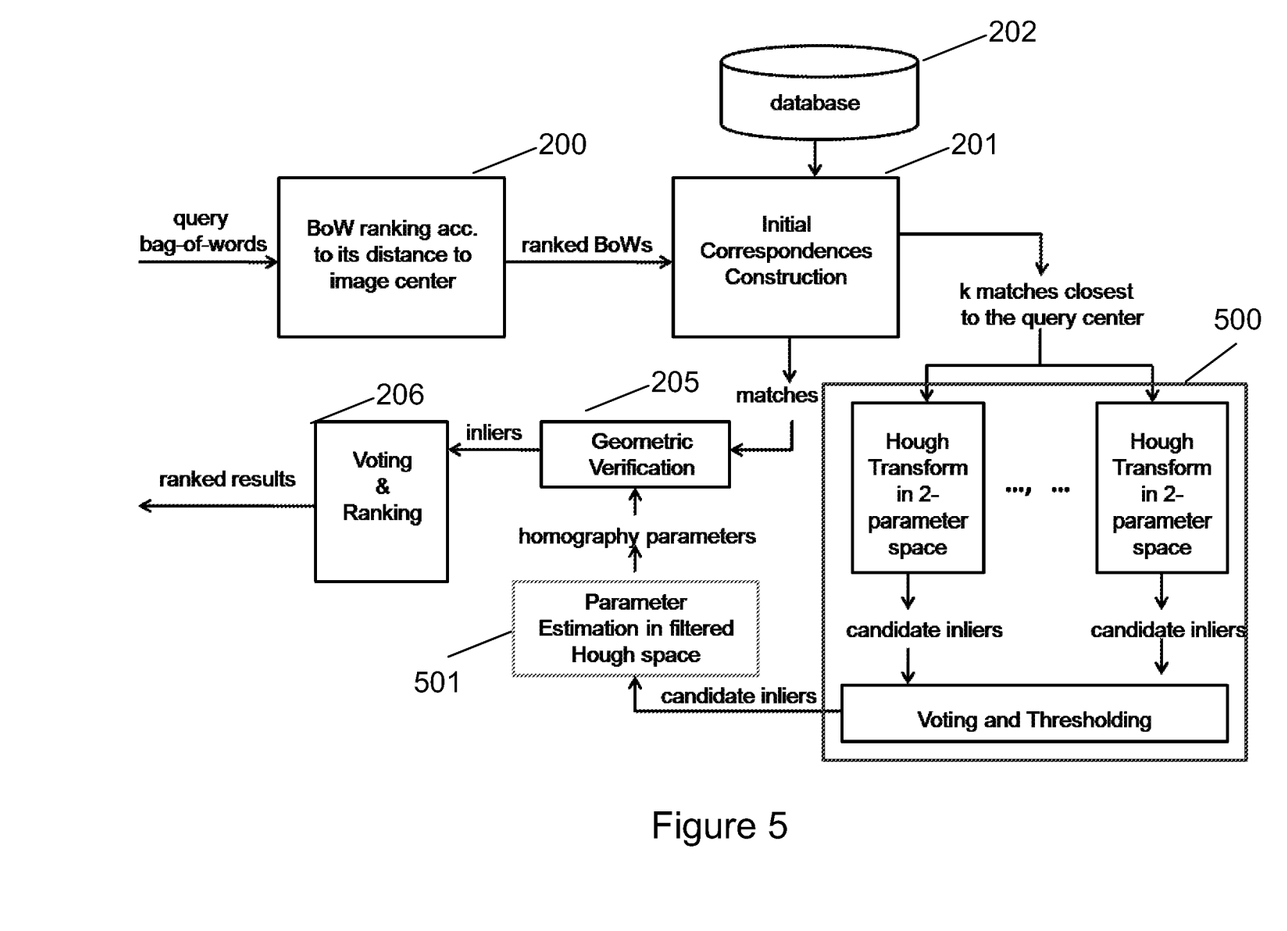
FIG. 5 illustrates an exemplary implementation of bundling a set of 2D Hough Transforms and accurately estimating parameters in the filtered Hough Space for Affine/Homography transformed images search, according to embodiments of the invention.
Figure 6:
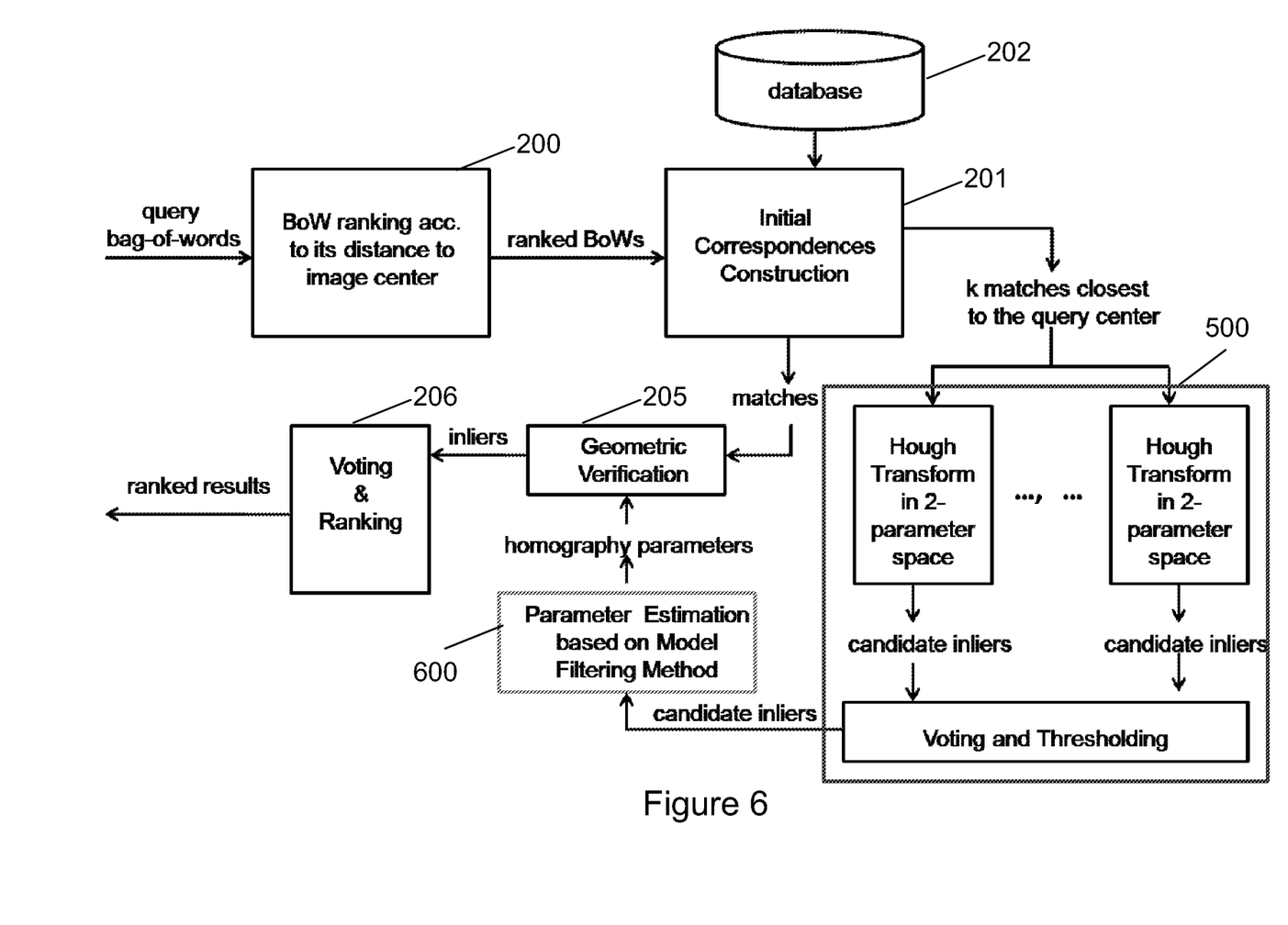
FIG. 6 illustrates an exemplary implementation of bundling a set of 2D Hough Transforms and Accurately Estimating Parameters based on the Model Filtering Method for Affine/Homography transformed images search, according to embodiments of the invention.

Accurate Affine/Homography Estimation in the Third-Level Hough Space or a Spatial Space After obtaining the inliers, accurate transformation parameters can be estimated via two ways as shown in FIGS. 5 and 6.

FIG. 5 illustrates an exemplary implementation of bundling a set of 2D Hough Transforms 500 and accurately estimating parameters in the filtered Hough Space for Affine/Homography transformed images search, according to embodiments of the invention. An accurate affine/homograph estimation is performed in the filtered Hough space 501. Either the average of the weighted quantized parameter values from inliers is used or the average of real parameter values estimated from the inliers is used to perform the estimation.

FIG. 6 illustrates an exemplary implementation of bundling a set of 2D Hough Transforms and Accurately Estimating Parameters based on the Model Filtering Method for Affine/Homography transformed images search, according to embodiments of the invention. The estimation of parameters can be conducted by returning to the spatial domain and estimating the parameters via model fitting approaches 600.

Evaluation

1. Performance Comparison Among DLT, LMEDS, RANSAC, and Methods According to Embodiments of the Invention Comparisons were conducted to test the performance of a method according to an embodiment of the invention against the other three well-known fitting methods, DLT, LMEDS and RANSAC in RST image detection applications. Performance is evaluated based on five metrics: Top1 detection rate, average matching time for matching 2000 images per query, true positive detection rate, true negative detection rate for true matched images and false matched images. Table 1 displays the performance based on these five metrics for the four methods. From the results we can observe, for RST image detection, our method achieves the best results for all these evaluation metrics comparing to the other methods.

TABLE 1

Performance comparison among different methods

|  | DLT | LMEDS | RANSAC | One Method |
|---|---|---|---|---|
| Top1 Acc - count | 0.855 | 0.949 | 0.953 | 0.958 |
| Time/2000 images (ms) | 151.5 | 1302.3 | 6394.2 | 4.4 |
| PP-T (mean) | 0.775 | 0.991 | 0.992 | 0.996 |
| NN-T (mean) | 0.909 | 0.992 | 0.990 | 0.992 |
| NN-F (mean) | 0.838 | 0.802 | 0.806 | 0.898 |

2. Large-Scale EMM Identification and Partial-Duplicate Image Detection Based on Embodiments of the Invention To evaluate the performance of basic embodiments of the invention on large-scale databases, experiments were conducted for two concrete applications: partial-duplicate image detection and EMM identification. For partial-duplicate image detection, the top10 precision is used, i.e. the average number of correct images within the top10 ranked list, as the accuracy evaluation metric. And for EMM identification, top3 accuracy is used, i.e. the percentage of query images whose target images are detected and ranked in the top three positions, as the evaluation metric.

Table 2 illustrates the performance of partial duplicate image detection on datasets of different sizes, and table 3 and 4 shows the performance of EMM identification for document images and natural images on datasets of different sizes. From the results in Table 2, 3 and 4, basic embodiments of the invention can achieve consistently high top10 precision and top3 accuracy in these applications when increasing the database size. In addition, the time and memory cost increases proportionally with the size of dataset and is reasonable even in a dataset with 200+ images.

TABLE 2

Performance of partial-duplicate image detection based on an embodiment of the invention on different sized datasets

|  | 10k | 50k | 100k | 200k |
|---|---|---|---|---|
| Top10 Precision | 8.789 | 8.763 | 8.658 | 8.526 |
| Time/query (ms) | 14.1 | 384.2 | 684.7 | 1164.5 |
| Memory (MB) | 17 | 237 | 470 | 880 |

TABLE 3

Performance of EMM document identification based on an embodiment of the invention on different sized datasets

|  | 10k | 50k | 100k | 200k |
|---|---|---|---|---|
| Top3 Acc - count | 0.991 | 0.991 | 0.991 | 0.991 |
|  | 156.7 | 237.7 | 495.7 | 505.0 |
| Time/query (ms) | 120 | 270 | 700 | 1200 |
| Memory (MB) |  |  |  |  |

TABLE 4

Performance of EMM natural image identification based on an embodiment of the invention on different sized datasets

|  | 10k | 50k | 100k | 200k |
|---|---|---|---|---|
| Top3 Acc - count | 0.998 | 0.998 | 0.997 | 0.997 |
|  | 68.9 | 178.8 | 406.1 | 567.2 |
| Time/query (ms) | 120 | 270 | 700 | 1200 |
| Memory (MB) |  |  |  |  |

Figure 7:
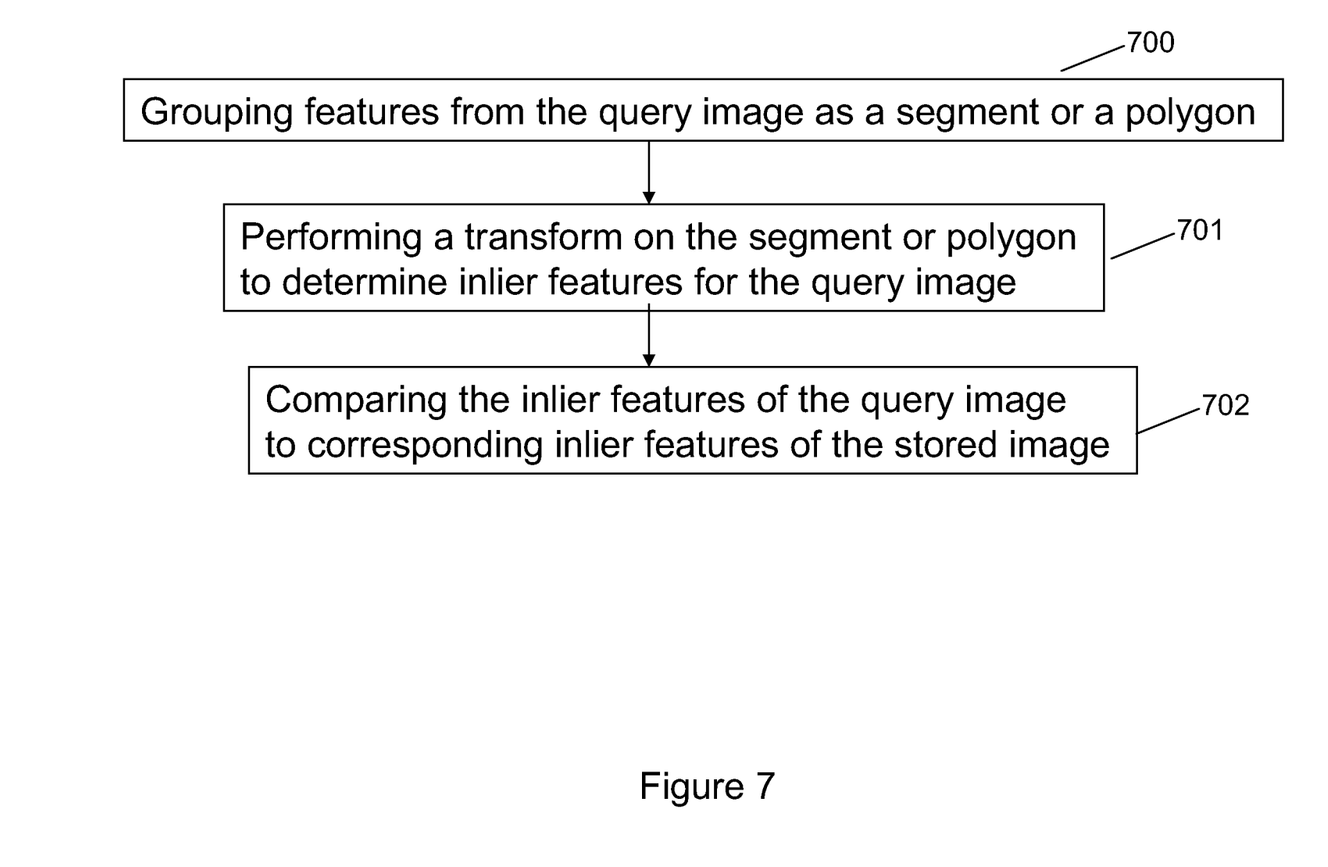
FIG. 7 illustrates an exemplary flowchart according to basic embodiments of the invention.

FIG. 7 illustrates an exemplary flowchart according to basic embodiments of the invention.

Grouping features from the query image as a segment or a polygon 700. At least two features are used in the subsequent transform, so a group of features is made from a segment or a polygon of features.

Performing a transform on the segment or polygon to determine inlier features for the query image 701. The transform may be a Hough transform.

Comparing the inlier features of the query image to corresponding inlier features of the stored image 702. The comparing may be done in either parametric or Hough space.

Figure 8:
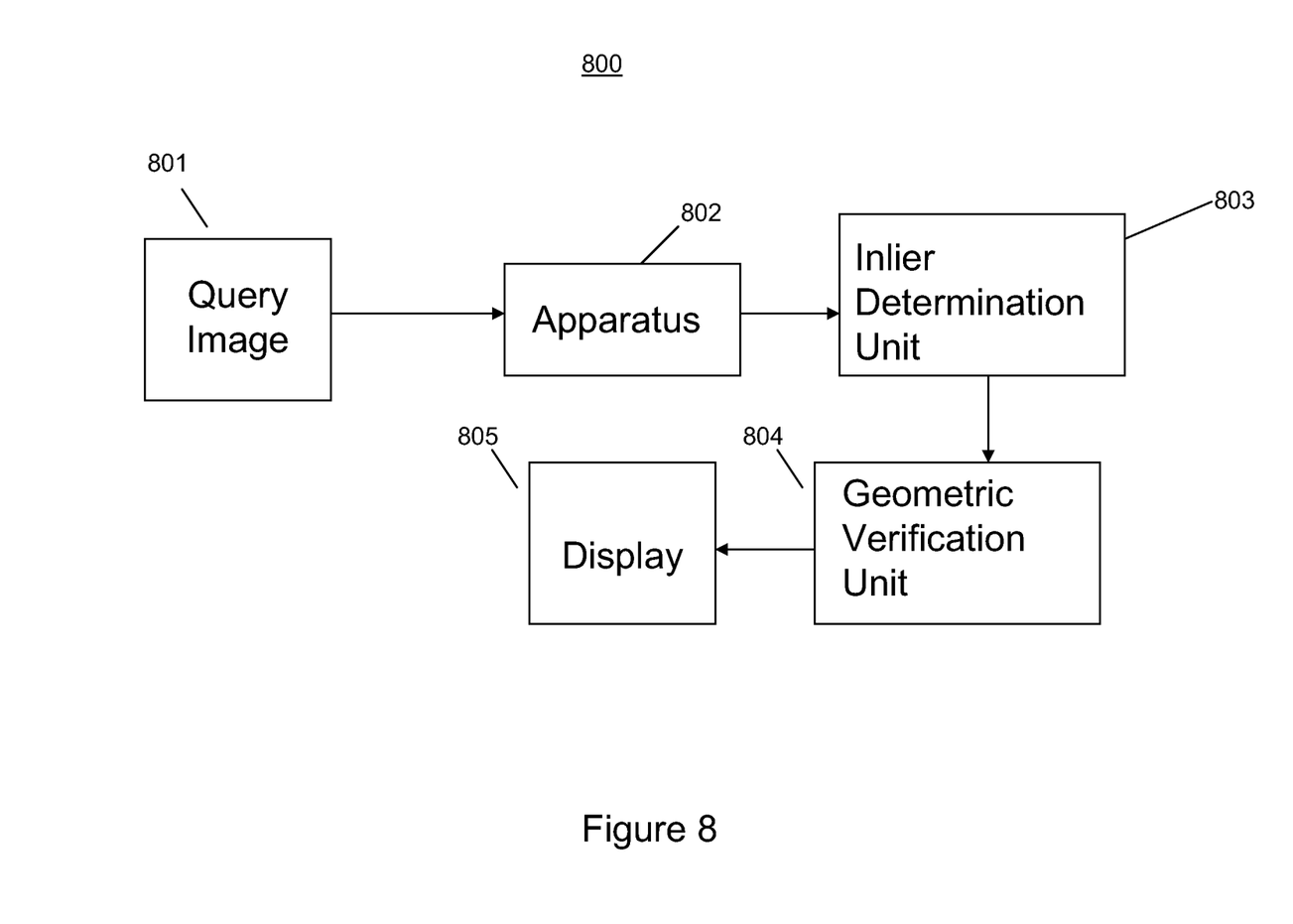
FIG. 8 illustrates an exemplary functional diagram according to embodiments of the invention.

FIG. 8 illustrates an exemplary functional diagram 800 according to embodiments of the invention.

A query image 800 is received by an apparatus 801, such as a camera, which feeds into an inlier determination unit 802, to determine the inliers of the query image. The results are fed into a geometric verification unit 803 which may run a comparison between the inliers of the query image and inliers of a stored image. The results may then be displayed on a display 804.

Figure 9:
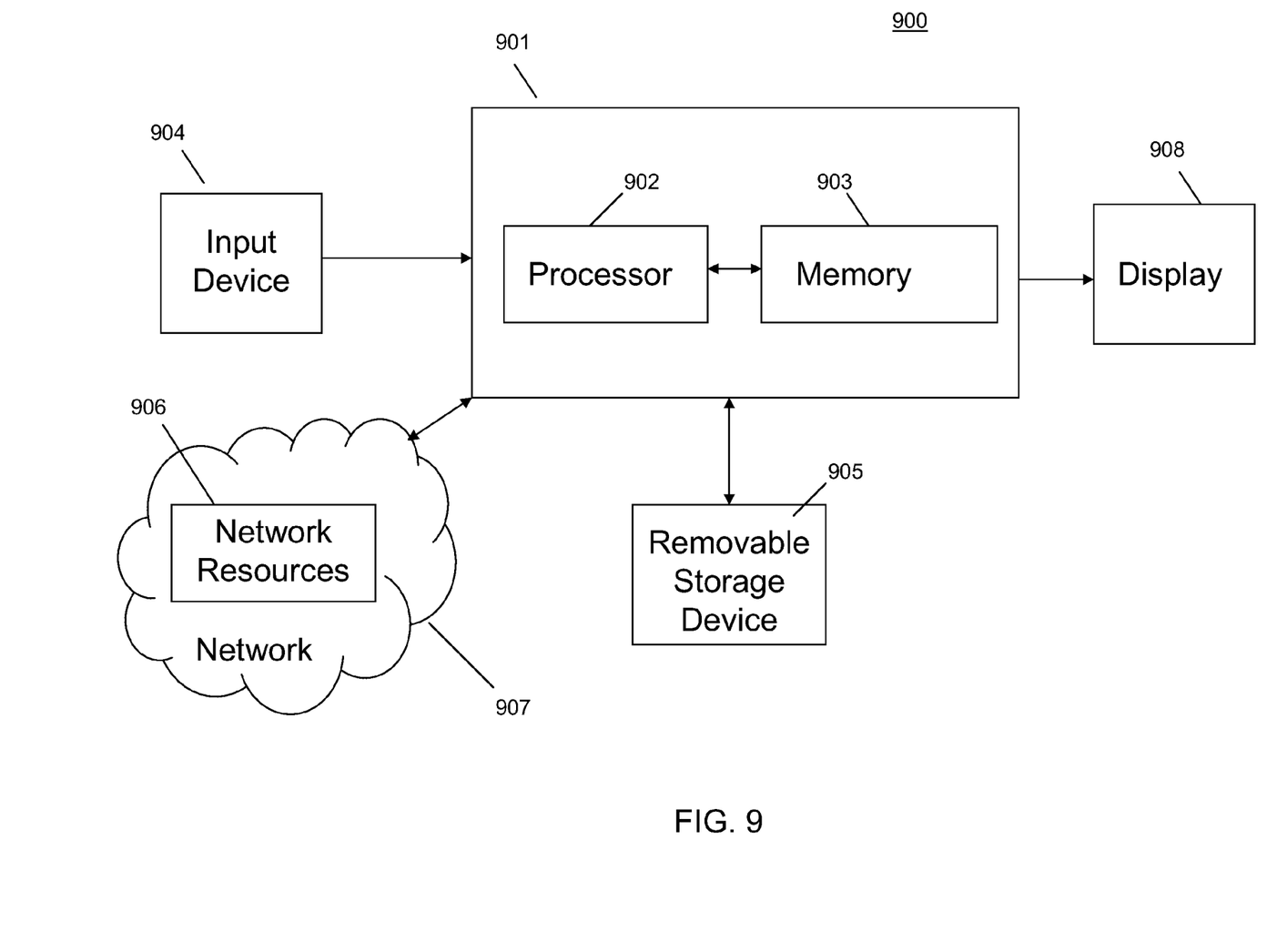
FIG. 9 illustrates an embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901 including a processor 902 and memory 903 which operate to execute instructions, as known to one of skill in the art. The term "computer-readable medium" as used herein refers to any medium that participates in providing instructions to processor 902 for execution. Additionally, the computer platform 901 receives input from a plurality of input devices 904, such as a keyboard, mouse, touch device or verbal command. The computer platform 901 may additionally be connected to a removable storage device 905, such as a portable hard drive, optical media (CD or DVD), disk media or any other medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may therefore further act as an input device 904 for interacting with a user.

Moreover, other implementations of the invention will be apparent to those skilled in the art from consideration of the specification and practice of the invention disclosed herein. Various aspects and/or components of the described embodiments may be used singly or in any combination in the image identification system. It is intended that the specification and examples be considered as exemplary only, with a true scope and spirit of the invention being indicated by the following claims.

What is claimed is:

1. A method of searching a data storage for an image, comprising:
    grouping features from a query image as a segment or a polygon;
    utilizing a processor to compute a transform of said segment or said polygon between the query image and at least one stored image stored in the data storage to obtain transform parameters;
    utilizing a grouping pattern on said transform parameters by identifying a dense region of said transformation parameters in Hough space;
    wherein the identifying the dense region of transformed features in Hough space comprises identifying a peak of total segment or polygon transformation parameters within a grid of the Hough space;
    utilizing a voting scheme to vote on inlier features for the query image; and
    utilizing the inlier features votes from the query image to search for a best matched stored image from said at least one stored image stored in the data storage.

2. The method of claim 1, wherein the transform is a Rotation Scale Translation (RST) or an Affine transform;
    wherein utilizing said voting scheme further comprises discarding features based on said voting scheme;
    wherein features not discarded are determined as the inlier features.

3. The method of claim 2, wherein identifying a dense region of transformed features in Hough space comprises:
mapping said segment or said polygon transformation parameters between the query image and said at least one stored image into Hough space;
identifying grids adjacent to the peak meeting a present threshold; and
identifying the dense region based on the peak and the identified grids.

4. The method of claim 1, wherein said obtaining of transform parameters between the query image and the stored image comprises comparing the transformed feature groups of the query image to transformed feature groups in said at least one stored image;
wherein the transform is an RST or an Affine transform;
wherein the transformation parameters are used to determine inlier features in Hough space for the query image and said at least one stored image.

5. The method of claim 1, wherein said obtaining of transformation parameters between the query image and the stored image by comparing the inlier features of the query image to transformed inlier features in the stored image in spatial domain;
wherein the transform is an RST or an Affine transform;
wherein the transformation parameters are used to vote for features in Hough space.

6. The method of claim 1, further comprising grouping features from the stored image as a segment or a polygon.

7. The method according to claim 1, wherein the query image comprises an object with a planar surface.

8. A system, comprising:
an apparatus for receiving a query image;
a processor grouping features from the query image as segments or a polygons and grouping features from each stored image stored in a data storage as segments or polygons, wherein the processor further conducts segment/polygon transformation to obtain transformation parameters for the query image and each stored image, wherein the processor selects query image inlier features from transformation parameter dense regions in Hough Space;
wherein said selecting query image inlier features from transformation parameter dense regions in Hough Space comprises identifying a dense region of transformed features in Hough space;
wherein identifying the dense region of transformation parameters in Hough space further comprises identifying a peak of total segment or polygon transformations between the query image and a stored image within a grid of the Hough space; and
a geometric verification unit checking the matching between the inlier features of the query image to corresponding inlier features of said each stored image stored in the data storage to search for a best matched stored image.

9. The system of claim 8, wherein said selecting query image inlier features from transformation parameter dense regions in Hough Space further comprises:
discarding transformed features based on a voting scheme;
wherein the transform is a RST, an affine transform, or a homography transform;
wherein transformed features not discarded are determined as the inlier features.

10. The system of claim 9, wherein identifying a dense region of transformation parameters in Hough space further comprises:
mapping said segment or said polygon transformation between the query image and said each stored image into Hough space;
identifying grids adjacent to the peak meeting a present threshold; and
identifying the dense region based on the peak and the identified grids.

11. The system of claim 8, further comprising a parameter estimation unit obtaining transformation parameters between the query image and said each stored image by measuring inlier feature transformation between the query image and the stored image;
wherein the transform is a Rotation Scale Translation (RST), an affine transform, or a homography transform;
wherein the transformation parameters are used to determine the corresponding inlier features in Hough space.

12. The system of claim 8, further comprising a parameter estimation unit obtaining transformation parameters between the query image and said each stored image by comparing the inlier features of the query image to transformed inlier features in the stored image in spatial domain;
wherein the transform is an RST, an affine transform, or a homography transform;
wherein the transformation parameters are used to determine the corresponding inlier features in Hough space.

13. The system of claim 8, wherein the apparatus is a camera.

14. A non-transitory computer readable medium executing a process, the process comprising:
grouping features from a query image as segments or polygons;
performing a segment or polygon transformation check in Hough Space to determine inlier features for the query image; and
utilizing the inlier features of the query image to search for a best matched stored image stored in a data storage
wherein the determining the inlier features for the query image comprises identifying a dense region of transformation parameters in Hough space; and
wherein identifying the dense region of transformed features in Hough space comprises identifying a peak of total segment or polygon transformation parameter sets within a grid of the Hough space.

15. The computer readable medium of claim 14, wherein the determining the inlier features for the query image comprises discarding features based on a voting scheme;
wherein the transform is a RST, an affine transform, or a homography transform;
wherein features not discarded are determined as the inlier features.

16. The computer readable medium of claim 15, wherein identifying a dense region of transformed features in Hough space further comprises:
mapping transformation parameters of said segment or said polygon into Hough space;
identifying grids adjacent to the peak meeting a present threshold; and
identifying the dense region based on the peak and the identified grids.

17. The computer readable medium of claim 14, wherein the process further comprises estimating transformation parameters between the query image and each stored image by comparing the transformed inlier features of the query image to transformed inlier features in said each stored image;
wherein the transform is a Rotation Scale Translation (RST), an affine transform, or a homography transform;

wherein the transformation parameters are used to determine the corresponding inlier features in Hough space.

18. The computer readable medium of claim 14, wherein the process further comprises estimating transformation parameters between the query image and each stored image by comparing the inlier features of the query image to transformed inlier features in said each stored image in spatial domain;

wherein the transform is a RST, an affine transform, or a homography transform;

wherein the transformation parameters are used to determine the corresponding inlier features in Hough space.

19. The computer readable medium of claim 14, wherein the process further comprises grouping features from each stored image as a segment or a polygon.

* * * * *